Feb. 7, 1928.

C. R. SHORT 1,658,576

INTERNAL COMBUSTION ENGINE PISTON

Filed Oct. 3, 1923

Witnesses
Wm. T. Pasco
Geo. E. Pasco

Inventor
Charles R. Short,
Francis D. Hardesty
By
His Attorney

Patented Feb. 7, 1928.

1,658,576

UNITED STATES PATENT OFFICE.

CHARLES R. SHORT, OF DAYTON, OHIO, ASSIGNOR TO GENERAL MOTORS RESEARCH CORPORATION, OF DAYTON, OHIO, A CORPORATION OF DELAWARE.

INTERNAL-COMBUSTION-ENGINE PISTON.

Application filed October 3, 1923. Serial No. 666,229.

The present invention relates to composite pistons, that is, pistons made of two or more metals or so-called "bimetallic" pistons.

Among the objects of the invention is a piston embodying the heat characteristics of metals such as aluminum and its alloys and the wearing properties of cast iron or other ferrous metal.

Another object is a piston of this type of simple design and which can be made cheaply and with facility and yet be efficient.

Further objects and advantages of the present invention will be apparent from the following description, reference being had to the accompanying drawings, wherein a preferred form of embodiment of the present invention is clearly shown.

Figure 1:
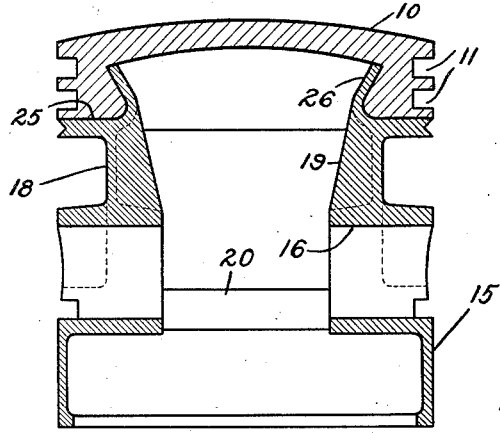
Fig. 1 is a vertical sectional view of the piston upon the plane of the axis of the pin bosses.
Figure 2:
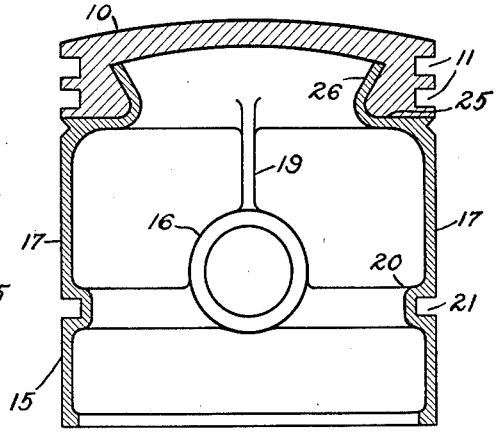
Fig. 2 is a similar view at right angles to that of Fig. 1.
Figure 3:
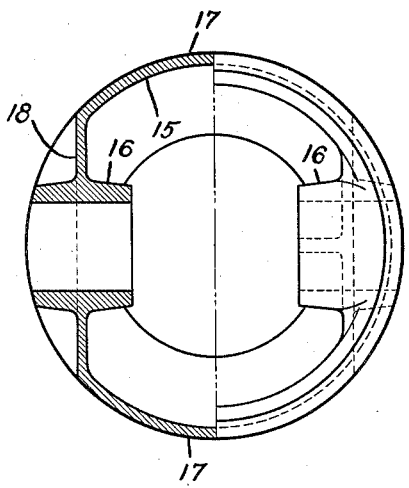
Fig. 3 is a part plan and part horizontal sectional view of the under side of the piston the section being taken on the plane of the axis of the pin bosses.
Figure 4:
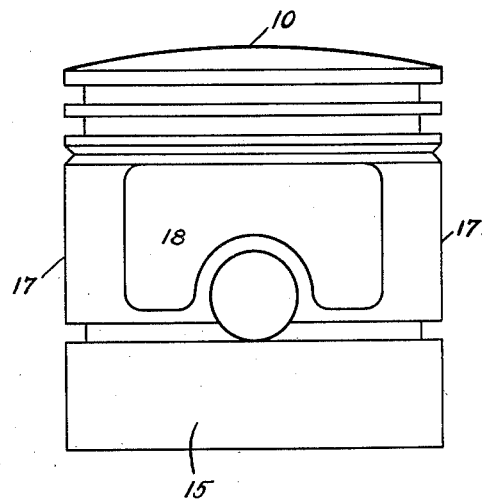
Fig. 4 is a view in elevation of the piston.

As indicated in the drawings, a piston forming the subject matter for the present application is composed of two portions, an inverted cupped head 10 carrying ring grooves 11, and a skirt portion 15 carrying the pin bosses 16 and the bearing surfaces 17. The head 10 is preferably of aluminum or its alloys for the benefit of light weight and heat conductivity. The skirt portion 15 is preferably of cast iron for the benefit of wearing qualities and coefficient of expansion which is about the same as that of the ordinary internal combustion engine cylinder.

This skirt portion 15 may be cast in the usual manner with integral pin bosses 16 and may be relieved of some of its metal around the bosses 16 as indicated at 18. It may also be provided with internal supporting ribs 19. Near the lower end of skirt portion 15 is formed an internal ring of metal 20 into which is cut an additional ring groove 21. This groove 21 crosses the openings in the pin bosses 16 and a packing ring in said groove will therefore function to prevent contact between the ends of a piston pin and the cylinder walls and, if desired, as an additional packing ring.

The upper end of skirt portion 15 is formed with a flat shoulder 25, which shoulder is continued from the outer surface of the skirt into a conoidal flange 26, shown in the illustrated embodiment as flaring outward toward the pressure surface of the piston head.

In forming the piston, an unmachined casting or skirt portion 15 is set in a mold of the usual type and the head portion 10 cast thereon so that its inner end rests upon shoulder 25 and surrounds flange 26 forming an interlocking joint therewith. In cooling, the head shrinks into place and forms a permanent joint between the parts.

After cooling, the casting is machined as a whole.

It is of course to be understood that while the preferred materials have been mentioned, other metals may be used and the form of design changed without departing from the scope of the invention as set out in the claims which follow.

What I claim is as follows:

1. A piston comprising a head, composed of metal of high heat conductivity, having ring grooves therein, and a skirt composed of a different metal of relatively low heat conductivity, said skirt having at one end a shoulder extending inward from the piston periphery, upon which the inner end of the head rests, and a flange provided with a conoidal surface interlocking with said head.

2. A bimetallic piston comprising a cast iron skirt portion provided with pin bosses and with a lesser diameter flared portion; and a cup shaped aluminum head portion cast over the said flared portion in such a manner as to permanently fix the two portions together.

3. A piston comprising an inverted cupped head, composed of metal of high heat conductivity, having ring grooves therein, and a skirt of ferrous metal; said skirt having at one end a shoulder extending inward from the piston periphery, upon which the annular end of the inverted cupped head rests, and a conoidal flange interlocking with said head.

4. A piston including a head, a body attached to said head, said body and head having contacting shoulders, and a flange on said body extending into said head so as to provide a dove-tail connection between said body and head.

5. A bi-metallic piston comprising a cast iron skirt portion provided with pin bosses and with a lesser diameter flared portion; and a cup-shaped aluminum head portion over said flared portion, one of said portions being cast on the other in such a manner as to permanently fix the two portions together.

In testimony whereof I hereto affix my signature.

CHARLES R. SHORT.